Figure 1:
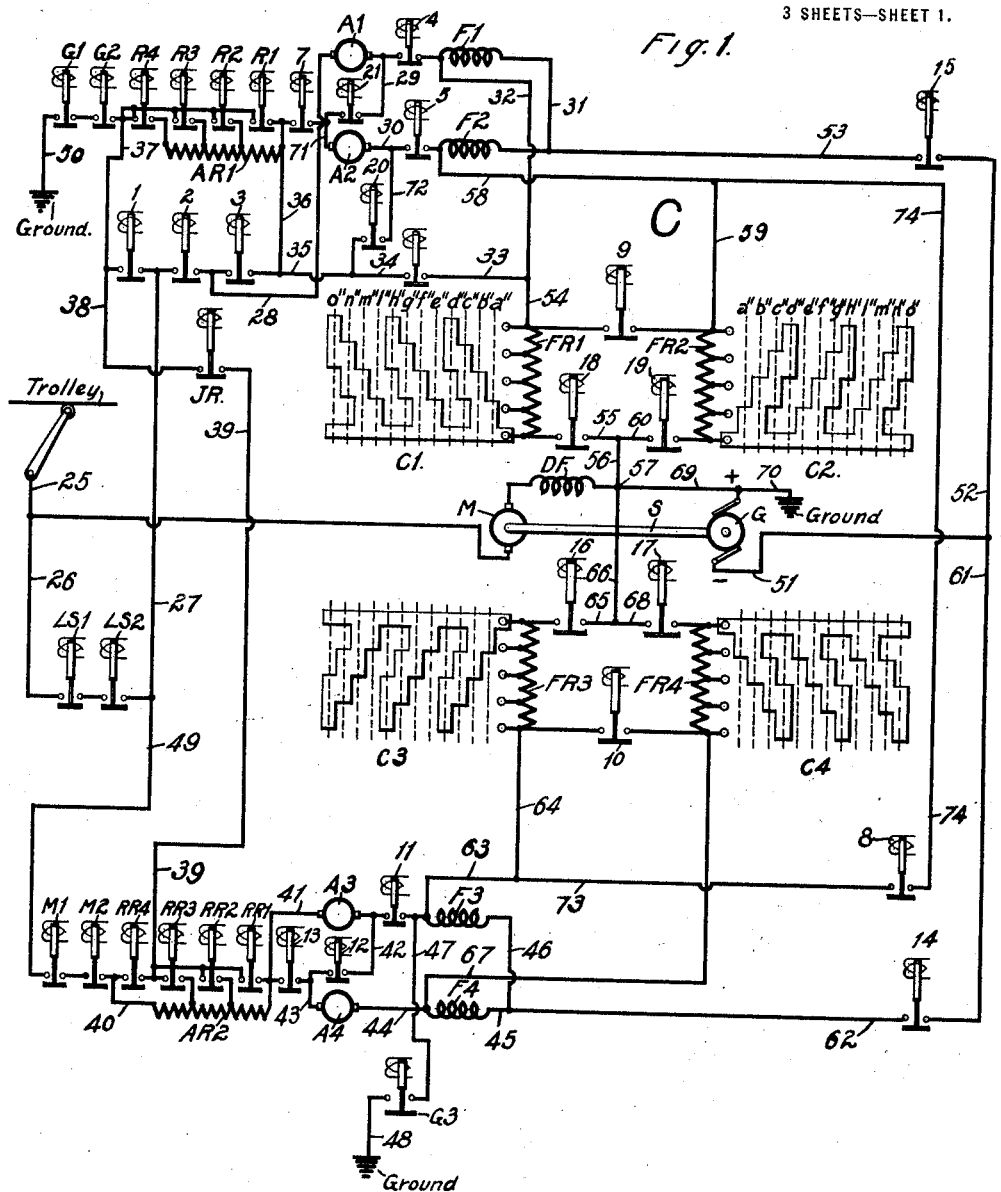

Fig. 2.

A. L. BROOMALL AND R. E. FERRIS.
SYSTEM OF CONTROL.
APPLICATION FILED NOV. 6, 1915.
1,314,501.
Patented Sept. 2, 1919.
3 SHEETS—SHEET 3.
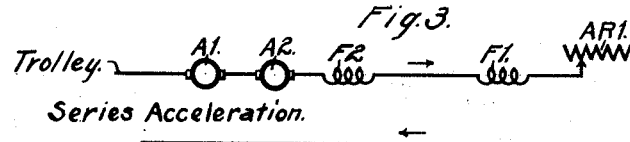
Series Acceleration.
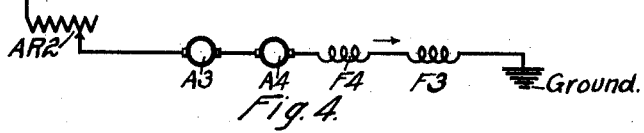
Parallel Acceleration.
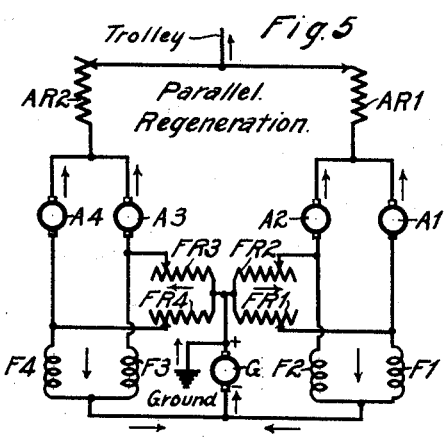
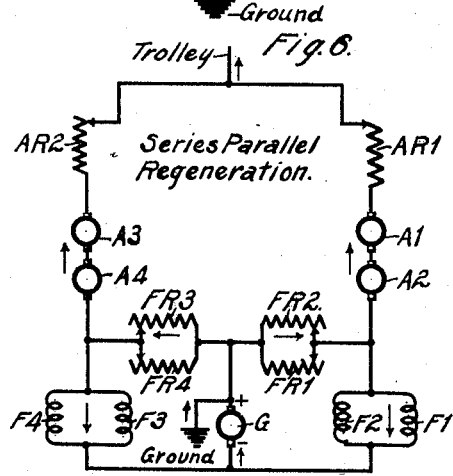
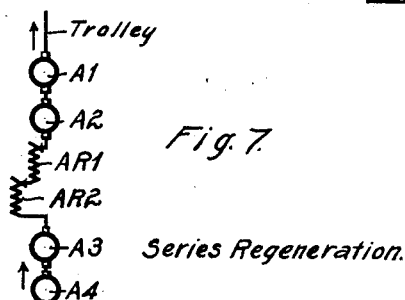
Fig. 7. Series Regeneration.
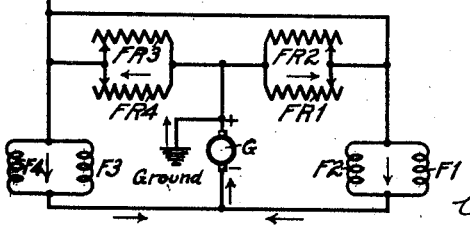
WITNESSES:
O. J. Fitzgerald
W. R. Coley
INVENTOR
Aubrey L. Broomall,
& Ralph E. Ferris.
BY
Wesley G. Carr
ATTORNEY

UNITED STATES PATENT OFFICE.

AUBREY L. BROOMALL, OF WILKINSBURG, AND RALPH E. FERRIS, OF SWISSVALE, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,314,501. Specification of Letters Patent. Patented Sept. 2, 1919.

Application filed November 6, 1915. Serial No. 59,992.

*To all whom it may concern:*

Be it known that we, AUBREY L. BROOMALL, a citizen of the United States, and a resident of Wilkinsburg, in the county of Allegheny and State of Pennsylvania, and RALPH E. FERRIS, a citizen of the United States, and a resident of Swissvale, in the county of Allegheny and State of Pennsylvania, have invented a new and useful Improvement in Systems of Control, of which the following is a specification.

Our invention relates to systems of control and particularly to the control of dynamo-electric machines, such as electric railway motors, that are adapted to act both as propelling motors and as regenerating machines.

One of the objects of our invention is to provide a system of the above-indicated character wherein a relatively heavy retarding or braking torque is provided during the initial or high-speed portion of the regenerative period.

More specifically stated, it is the object of our invention to provide a system embodying a plurality of pairs of dynamo-electric machines, each pair of machines being connected in series relation throughout the accelerating period and all such machines being connected in parallel-circuit relation during the initial or high-speed portion of the regenerating period, whereby the total retarding or braking torque, at a predetermined speed, shall approximately equal the combined accelerating torque at substantially one half of that speed, the ratio of field-winding current to armature current remaining substantially the same in both the accelerating and the regenerating operation.

In systems employing the usual type of electric railway motors for regenerative purposes, the amount of current which can be regenerated at a predetermined speed, without causing flashing or other undesirable characteristics, is limited by the ratio of field current to armature current, as is well known to those skilled in the art. Consequently, since the torque of a dynamo-electric machine is proportional to the product of field flux and armature current, it follows that the retarding or braking torque under relatively high-speed conditions has heretofore been comparatively low, and the rate of braking of an electric vehicle during the initial or high-speed portion of its regenerative period has been relatively low.

To obviate the above-mentioned difficulty, we provide a system wherein a plurality of pairs of dynamo-electric machines are permanently connected in local series relation during acceleration and in parallel relation during the regenerative period. During acceleration, therefore, each motor receives a maximum of one-half of the supply-circuit voltage, whereas, during regeneration, a voltage value approximately equal to the supply-circuit voltage is delivered by each machine. As one means of providing a machine with the required characteristics for operation from a customary 600-volt railway circuit, each motor could be "multiple wound", in accordance with a familiar construction, and such a motor would operate with a voltage of 300 volts during acceleration and would deliver approximately 600 volts during the regenerative period, when connected in the manner just described. Each motor would, of course, have a sufficient number of commutator bars to successfully operate in connection with the 600-volt circuit. With the above-mentioned series accelerating connections, if the full load of a motor at the end of the "straight-line acceleration" period is 500 amperes at 600 RPM, the field-winding current is also 500 amperes, and a predetermined combined accelerating torque, which is proportional to the product of the armature current and field-winding flux, is obtained. By "straight-line acceleration", we mean the initial portion of the accelerating period, while the motors are running with resistance in circuit and before they run in accordance with that portion of the speed-time curve that lies above the bend or knee of the curve. It will be appreciated that, at the finish of the entire accelerating period, the motor speeds are materially increased and may attain a double value of 1200 RPM, in the case assumed. With the motors connected in parallel relation during the initial portion of the regenerative period, if an initial speed of 1200 RPM is obtained, the machines will regenerate 500 amperes each and a current of 500 amperes traverses the field-magnet windings. Consequently, the same total retarding or braking torque is obtained at 1200 RPM as accelerating torque at 600 RPM.

Figure 2:
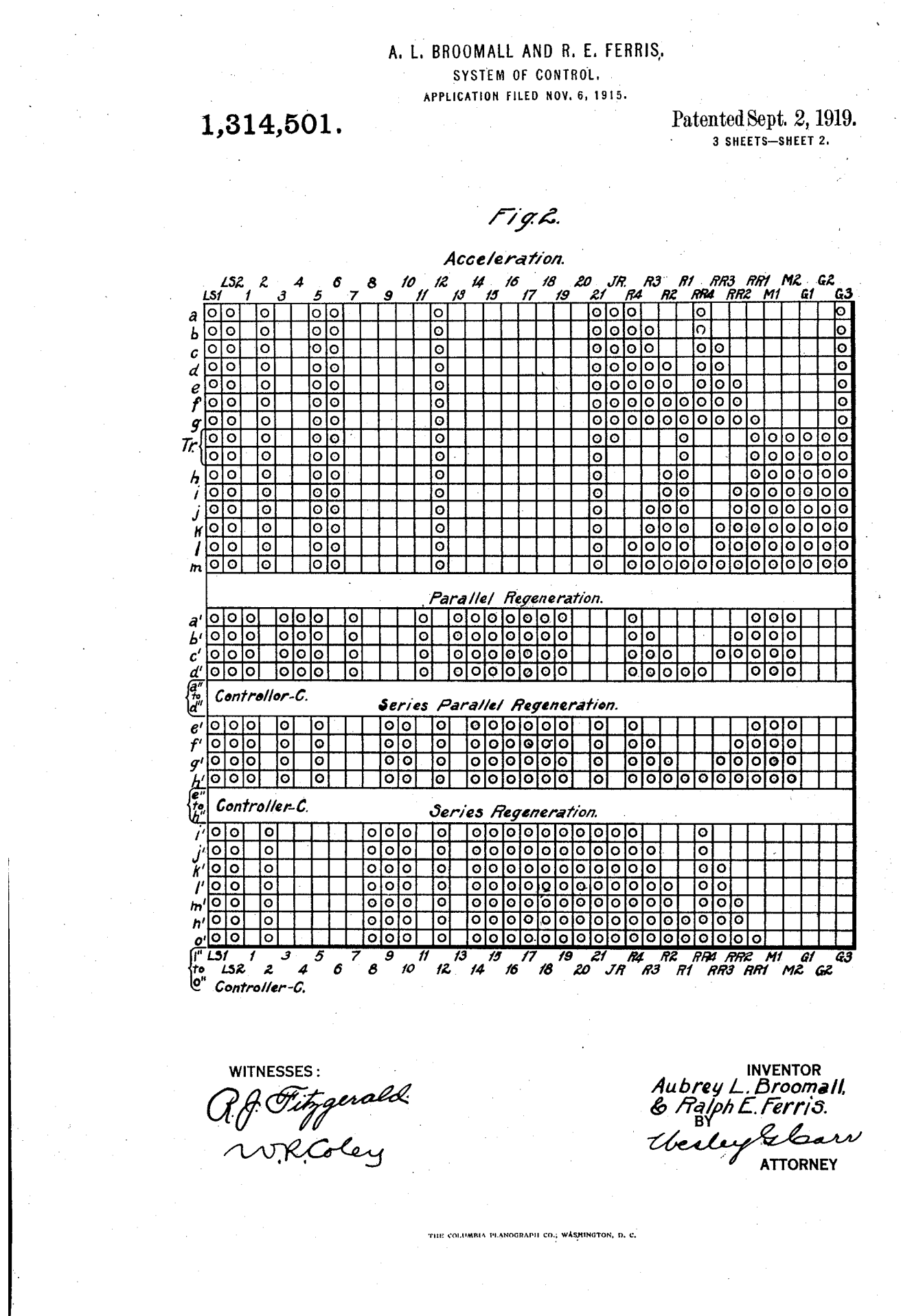

In the accompanying drawing, Figure 1 is a diagrammatic view of the main circuits of a system of control embodying our invention; Fig. 2 is a sequence chart of well-known form that indicates the sequence of operation, during both the accelerating and the regenerating periods, of the various motor-controlling switches that are shown in Fig. 1; and Figs. 3 to 7, inclusive, are simplified diagrammatic views illustrating the main-circuit connections during series acceleration, parallel acceleration, parallel regeneration, series-parallel regeneration and series regeneration, respectively.

Referring to Fig. 1 of the drawings, the system shown comprises a plurality of supply-circuit conductors respectively marked Trolley and Ground; a plurality of dynamo-electric machines respectively having armatures A1, A2, A3 and A4 and field-magnet windings F1, F2, F3 and F4; a plurality of suitable switching devices LS1, LS2, 1 to 21, inclusive, JR, M1, M2, G1, G2 and G3 for manipulating the various main-circuit connections in accordance with the sequence chart of Fig. 2; an accelerating resistor AR1 with which is associated a plurality of switches R1 to R4, inclusive; a second accelerating resistor with which a plurality of switches RR1 to RR4 are associated; a plurality of field-regulating resistors FR1, FR2, FR3 and FR4 that are associated with the field-magnet windings F1, F2, F3 and F4, respectively, during the regenerative period, in a manner to be described; a suitable source of energy, such as a dynamotor of a familiar type, comprising a motor armature winding M, a generator armature winding G and a common field-magnet winding DF, the generator armature G being employed to energize the main field-magnet windings through the various field-regulating resistors during the regenerative period; and a suitable controller C having a plurality of sets of contact segments C1, C2, C3 and C4 that are adapted to short-circuit the field-regulating resistors FR1, FR2, FR3 and FR4, respectively in a step-by-step manner.

The dynamotor may have its armature windings mechanically connected together in any suitable manner, as by assembly on a common shaft $s$. The motor winding M may be connected in series relation with the field-magnet winding DF across the supply circuit, while the generator armature winding G is connected between the negative conductor, Ground, and certain portions of the field-winding circuits during the regenerative period, as set forth later. Although the dynamotor is employed for field excitation purposes during regeneration only, it will be understood that the dynamotor may be employed during the accelerating period for the customary purpose of driving an air compressor or in any other suitable manner, if desired.

For the sake of simplicity and clearness, the controller C is illustrated as being of a familiar hand-controlled type having three groups of positions $a''$ to $d''$, inclusive, $e''$ to $h''$, inclusive, and $l''$ to $o''$, inclusive, for simultaneously and gradually short-circuiting the corresponding field-regulating resistors and disposing them in active circuit relation again, as hereinafter more fully described. It will be understood that, if desired, any suitable mechanical or automatic operating mechanism for the controller C may be employed; for example, a rack-and-pinion mechanism that is operated, in accordance with the regenerated current, by a plurality of electrically-governed, pneumatically-actuated piston members, as fully shown and described in a co-pending application of N. W. Storer, Serial No. 724,068, filed October 5th, 1912, patented Nov. 6, 1917, No. 1,245,523, and assigned to the Westinghouse Electric & Manufacturing Company. However, inasmuch as the particular type of controller that is employed is immaterial to our present invention, we have not deemed it necessary to show or describe any such mechanism.

Moreover, the customary reversing-switch for reversing the electrical relations of the several main armatures and field-magnet windings has also been omitted, for the sake of simplicity and clearness. It will be understood, however, that such a reversing switch will normally be employed in connection with our system, although the reversal of the field-magnet windings during the regenerative period is not necessary in the system about to be described.

Inasmuch as the particular type of motor-controlling switching devices is not relevant to our present invention, we have not thought it necessary for a full and complete understanding of our invention to illustrate any governing system, which, in the case in question, would merely embody a master controller of the usual type that is adapted to energize the actuating coils of the various switches in accordance with the desired sequence. Any other type of control, such as that embodying a controller having a plurality of main-circuit contact members and control fingers that correspond to the various switches, may be employed. Consequently, the operation of the system will be described in conjunction with the sequence chart of Fig. 2, and no further exposition of a governing system is believed to be required.

Assuming that it is desired to accelerate the motors, the master controller (not shown) may be moved to its initial position corresponding to $a$ of the sequence chart of Fig. 2, whereupon the switches LS1, LS2, 2, 5, 6, 12, 21, JR, R4, RR4 and G3 are closed to establish a circuit from the Trolley, through conductors 25 and 26, switches LS1 and LS2, conductor 27, switch 2, conductor 28, the armature A1, conductor 29, switch 21, armature A2, conductor 30, switch 5, field-magnet winding F2, conductor 31, field-magnet winding F1, conductors 32 and 33, switch 6, conductors 34, 35 and 36, the accelerating resistor AR1, switch R4, conductors 37 and 38, switch JR, conductor 39, switch RR4, conductor 40, accelerating resistor AR2, conductor 41, armature A3, conductor 42, switch 12, armature A4, conductor 44, field-magnet winding F4, conductors 45 and 46, field-magnet winding F3, conductor 47, switch G3 and conductor 48 to the negative conductor Ground.

In position $b$ of the master controller (not shown) the switch R3 is closed to short-circuit a predetermined portion of the resistor AR1, and in position $c$ the switch RR3 is closed to similarly exclude from circuit a portion of the resistor AR2.

In the succeeding positions $d$, $e$, $f$ and $g$, the switches R2, RR2, R1 and RR1 are successively closed to complete the short-circuit of the accelerating resistors and thus dispose the motors in full-series relation.

The general motor connections during the series portion of the accelerating period are illustrated in Fig. 3.

To effect the transition of the motors from series to parallel relation, the switches R4, R3, R2, RR4, RR3 and RR2 are first opened, and switches M1, M2, G1 and G2 are subsequently closed. By the closure of switches M1 and M2, a circuit is completed from the positive conductor 27, through conductor 49, the switches M1 and M2, the resistor AR2, conductor 41, the armature A3 and thence to the negative conductor Ground, as already described. A further circuit is established from conductor 36, through switches R1, G2 and G1 and conductor 50 to the negative conductor Ground.

In the next transition position, the switch JR is opened, whereby the motors are connected in series-parallel relation, with the accelerating resistors AR1 and AR2 in circuit with the respective pairs of motors, as diagrammatically illustrated in Fig. 4.

In the remaining master-controller positions, $h$ to $m$, inclusive, the resistor-short-circuiting switches R2, RR2, R3, RR3, R4 and RR4 are successively closed to gradually short-circuit the accelerating resistors and dispose the motors in full series-parallel relation.

It will be observed that the pairs of motors A1 and A2, and A3 and A4, respectively, remain in local series relation throughout the accelerating period, and a predetermined combined accelerating torque is obtained at the end of the "straight-line acceleration" period and a comparatively low combined torque at the finish of the entire accelerating period, accompanied by a relatively low motor-current value and relatively high motor speed, as will be understood.

Assuming that it is desired to effect regenerative operation of the system, the master controller (not shown) may be moved from its off position to its initial regenerative position $a'$, whereupon the switches LS1, LS2, 1, 3, 4, 5, 7, 11, 13 to 19, inclusive, R4, RR1, M1, and M2 are closed to complete a circuit from the negative terminal of the generator armature winding G, through conductors 51 and 52, switch 15, conductor 53, where the circuit divides one branch including conductor 31, field-magnet winding F1, conductors 32 and 54, field-regulating resistor FR1, switch 18, conductors 55 and 56 to a junction-point 57, and the other branch including field-magnet winding F2, conductors 58 and 59, field-regulating resistor FR2, switch 19, and conductors 60 and 56 to the junction-point 57.

A similar circuit for the other field-magnet windings is completed from conductor 51, through conductor 61, switch 14 and conductor 62, where the circuit divides, one branch including conductor 46, field-magnet winding F3, conductors 63 and 64, field-regulating resistor FR3, switch 16 and conductors 65 and 66 to the junction-point 57, while the other branch includes conductor 45, field-magnet winding F4, conductor 67, field-regulating resistor FR4, switch 17, and conductors 68 and 66 to the junction-point 57, whence a common circuit is completed through conductors 69 and 70 to the negative conductor Ground.

The generator armature winding G is thus connected in parallel relation to circuits including field-magnet winding F1 and field-regulating resistor FR1, field-magnet winding F2 and field-regulating resistor FR2, and similar circuits for the other field-magnet windings F3 and F4.

It will be observed that current traverses the several field-magnet windings in the same direction as the accelerating current, inasmuch as the positive terminal of the generator armature G is directly connected to Ground, while the armature currents are reversed as set forth below.

The main armatures are connected as follows: from the Trolley, through conductors 25 and 26, switches LS1 and LS2, conductor 27, switch 1, conductor 37, switch R4 and accelerating resistor AR1, where the circuit divides, one branch including switch 7, conductor 71, armature A2, conductor 30, switch 5 and conductors 58 and 59 to the upper terminal of the field-regulating resistor FR2, while the other branch includes conductor 36, switch 3, conductor 28, armature A1, switch 4 and conductors 32 and 54 to the upper terminal of the field-regulating resistor FR1.

The other main armatures are connected in a circuit including conductor 49, switches M1 and M2 and resistor AR2, where the circuit divides, one branch including conductor 41, armature A3, switch 11 and conductors 63 and 64 to the lower terminal of the field-regulating resistor FR3, while the other branch includes switch 13, conductor 43, armature A4, conductor 44 and conductor 67 which is connected to the lower terminal of the field-regulating resistor FR4.

The main armatures are thus all disposed in parallel relation, the resistors AR1 and AR2 being disposed in common series-circuit relation with the pairs of regenerating armatures A1 and A2, and A3 and A4, respectively, and each armature being connected to the junction-point of the corresponding field-magnet winding and field-regulating resistor. The circuits are illustrated in Fig. 5.

In position $b'$ of the master controller (not shown) the switches R3 and RR2 are closed to simultaneously short-circuit corresponding portions of the accelerating resistors AR1 and AR2, while, in positions $c'$ and $d'$, the switches R2 and RR3, and R1 and RR4 are respectively closed in pairs to complete the short-circuit of the resistors AR1 and AR2. To permit further regulation of the regenerative operation, the preferred scheme, of course, maintaining a substantially constant current as the machine speeds decrease, the controller C may be actuated either manually or automatically, in the manner above outlined, through its positions $a''$ to $d''$, inclusive, to simultaneously short-circuit successive steps of the several field-regulating resistors and thereby increase the excitation of the main field-magnet windings as the speeds of the machines decrease.

It should be observed that, by reason of the parallel relation of the several main armatures, the total retarding or braking torque during the initial or high-speed portion of the regenerative period just described is relatively high and, in fact, in the case assumed, where the initial regenerative speed substantially equals the final accelerating speed, the combined retarding torque is substantially equal to the total accelerating torque at the end of "straight-line acceleration," and a desirably high rate of retardation is obtained during the high-speed portion of the regenerative period.

If it is desired to continue regenerative operation, with the machines disposed in series-parallel relation, the master controller (not shown) may be next moved to its position $e'$, whereby the switches 4, 7, 11 and 13 are opened and switches 9, 10, 12 and 21 are then closed. Although, for the sake of simplicity and clearness, we have thus shown and described an open-circuit type of transition from parallel to series-parallel relation of the regenerating armatures, it will be understood that the particular type of transition set forth is not material to our present invention and that any other suitable form of transition may be used.

Under the conditions named, the following changes in the main circuits are effected. The closure of the switches 9 and 10 connects the upper terminals of the field-regulating resistors FR1 and FR2 and the lower terminals of the field-regulating resistors FR3 and FR4, respectively, whereby the pairs of resistors FR1 and FR2, and FR3 and FR4 are connected in local parallel relation, and also the pairs of field-magnet windings F1 and F2 and F3 and F4 are connected in local parallel relation. In addition, the opening of switches 11 and 14 and the subsequent closure of switches 12 and 21 connects the pairs of armatures A1 and A2 and A3 and A4 in series relation, in accordance with the circuits already traced during the acceleration of the motors.

The main-circuit connections during the period of series-parallel regeneration are diagrammatically illustrated in Fig. 6.

Regulation of the regenerative operation as the machine speeds decrease may be effected by first manipulating the master controller (not shown) through its positions $f'$, $g'$, and $h'$ and then actuating the controller C through its positions $e''$ to $h''$, thereby gradually and simultaneously short-circuiting the resistors AR1 and AR2 and then gradually excluding the several field-regulating resistors from circuit.

If it is desired to effect series regeneration of the machines, the master controller (not shown) may next be actuated to its position $i'$, whereby switches 1, 3, 5, M1 and M2 are opened and switches 2, 8, 20 and JR are closed.

It will be understood that, in this case also, although an open-circuit type of transition is here shown, any other suitable form of transition may be substituted.

In the initial series regenerative position, a circuit is completed from the Trolley, through conductors 25 and 26, switches LS1 and LS2, conductor 27, switch 2, conductor 28, armature A1, conductor 29, switch 21, armature A2, conductors 30 and 72, switch 20, conductors 35 and 36, resistor AR1, switch R4, conductors 37 and 38 switch JR, conductor 39, switch RR4, resistor AR2, conductor 41, armature A3, conductor 43, switch 12, conductor 43, armature A4 and conductor 44, where the circuit divides, one branch including field-magnet winding F4, conductors 45 and 46, field-magnet winding F3, conductors 63 and 64, switch 10 and conductor 67 which is connected to conductor 44, whereby the field-magnet windings F3 and F4 are connected in parallel relation and a terminal of each field winding is connected through conductor 62 and the associated circuit with the positive terminal of the generator armature winding G.

A further branch circuit is completed from conductor 44, through conductor 67, switch 10, conductors 64 and 73, switch 8, conductors 74 and 58, whence circuit is continued through field-magnet winding F2, conductor 31, field-magnet winding F1, conductors 32 and 54, switch 9 and conductor 59 to conductor 58, whereby the field-magnet windings F1 and F2 are disposed in parallel relation and one terminal of each field winding is connected through conductor 53 and the associated circuit to the positive terminal of the generator armature winding G.

Another circuit is established from the conductor 44, through conductor 67, the parallel-connected field-regulating resistors FR3 and FR4, since the switches 10, 16 and 17 are closed, and conductor 66 to the junction-point 57 and the negative conductor Ground. Moreover, the conductor 74 is connected to conductor 59, whence circuit is completed through the parallel-connected field-regulating resistors FR1 and FR2, inasmuch as the switches 9, 18, and 19 are closed, and conductor 56 to the junction-point 57 and the negative conductor Ground.

The main armatures are thus connected in series relation with the resistors AR1 and AR2, while the generator armature winding G is adapted to energize a plurality of circuits, one including the parallel-connected resistors FR1 and FR2 and the parallel-connected field-magnet windings F1 and F2 and the other circuit including the parallel-connected resistors FR3 and FR4 and the parallel-connected field-magnet windings F3 and F4, and each of the circuits just recited is connected in series relation with the main armatures. The main-circuit connections for series regeneration are diagrammatically illustrated in Fig. 7.

To further regulate the regenerative operation as the speeds of the machines decrease, the master controller (not shown) may be moved through positions $j'$ to $o'$, inclusive, whereby switches R3, RR3, R2, RR2, R1 and RR1 are successively closed to gradually short-circuit the resistors AR1 and AR2. Subsequently, the controller C may be operated through its final group of positions $l''$ to $o''$ to gradually exclude the several field-regulating resistors from circuit. In this way, the regenerative operation of the system may be carried to a relatively low vehicle speed, and, if desired, the mechanical or air brakes of the vehicle may then be automatically brought into operation upon the opening of the motor circuits, as shown and described in a co-pending application of N. W. Storer, Serial No. 860,608, filed September 8, 1914, Patented Nov. 6, 1917, No. 1,245,398, and assigned to the Westinghouse Electric & Manufacturing Company.

It will be seen that we have thus provided a system wherein a plurality of dynamo-electric machines may be connected to provide a certain speed and combined torque under accelerating conditions and re-connected to provide a substantially equal combined torque at a materially higher speed under electric braking conditions, the ratio of field-winding current to armature current remaining substantially the same.

We do not wish to be restricted to the specific circuit connections or arrangement of parts herein set forth, as various modifications thereof may be made without departing from the spirit and scope of our invention. We desire, therefore, that only such limitations shall be imposed as are indicated in the appended claims.

We claim as our invention:

1. In a system of control, the combination with a plurality of dynamo-electric machines adapted for both acceleration and electric braking, of means for accelerating said machines through series and series-parallel relation to a predetermined speed accompanied by a relatively low current and combined torque, and means for reconnecting said machines in parallel relation and then in series-parallel relation to provide a relatively heavy current and combined braking torque at the lower speed corresponding to series-parallel braking operation.

2. In a system of control, the combination with a plurality of dynamo-electric machines adapted for both acceleration and electric braking, of means for successively connecting the machines in series and in series-parallel relation for completely accelerating the machines and for connecting the machines in parallel relation at the final accelerating speed to provide initial electric braking conditions, whereby the initial combined braking torque is relatively high.

3. In a system of control, the combination with a plurality of dynamo-electric machines adapted for both acceleration and electric braking, of means for successively connecting the machines in series and in series-parallel relation for completely accelerating the machines to a certain speed and for successively connecting the machines in parallel relation at that speed and then in series-parallel, and series relation during the successive portions of the electric braking period, whereby the initial combined braking torque is relatively high.

4. The method of operating a plurality of dynamo-electric machines that consists in connecting the machines to provide a certain speed and combined torque under accelerating conditions and then connecting the machines to provide a substantially equal torque at a materially higher speed under electric braking conditions while maintaining the ratio of armature current to field current substantially constant.

5. The method of operating a plurality of dynamo-electric machines that consists in accelerating the machines to a predetermined speed accompanied by a relatively low current and combined torque, and then reconnecting the machines to provide a relatively heavy combined braking torque at a corresponding speed while maintaining the ratio of armature current to field current substantially constant.

6. The method of operating a plurality of dynamo-electric machines adapted for both acceleration and electric braking that consists in successively connecting the machines in series and in series-parallel relation for completely accelerating the machines and connecting the machines in parallel relation at the final accelerating speed to provide initial electric braking conditions.

7. The method of operating a plurality of dynamo-electric machines adapted for both acceleration and electric braking that consists in successively connecting the machines in series and in series-parallel relation for completely accelerating the machines to a certain speed and successively connecting the machines in parallel relation at that speed and then in series-parallel and series relation for electrically braking the machines.

8. In a system of control, the combination with a supply circuit and a plurality of dynamo-electric machines adapted for both acceleration and electric braking, of means for connecting said machines to said supply circuit in different groupings to effect acceleration to a speed corresponding to the absorption of a certain portion of the supply-circuit voltage per armature, and means for regrouping the machines to provide electric braking conditions at that speed with substantially twice the voltage per armature.

9. In a system of control, the combination with a supply circuit and a plurality of dynamo-electric machines adapted for both acceleration and electric braking, of means for connecting said machines to said supply circuit in different groupings to accelerate the machines to a predetermined speed accompanied by a relatively low current and combined torque, and means for regrouping the machines to provide substantially twice that torque for effecting heavy electric braking at said speed while maintaining the ratio of armature current to field current substantially constant.

In testimony whereof we have hereunto subscribed our names this 30th day of Oct., 1915.

AUBREY L. BROOMALL.
RALPH E. FERRIS.

Copies of this patent may be obtained for five cents each, by addressing the "Commissioner of Patents, Washington, D. C."